(12) United States Patent
Chu

(10) Patent No.: US 9,521,308 B2
(45) Date of Patent: Dec. 13, 2016

(54) ELECTRONIC DEVICE AND METHOD FOR CONTROLLING FLASH

(71) Applicant: Chiun Mai Communication Systems, Inc., New Taipei (TW)

(72) Inventor: Kuei-Lin Chu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 151 days.

(21) Appl. No.: 14/594,333

(22) Filed: Jan. 12, 2015

(65) Prior Publication Data

US 2015/0229820 A1    Aug. 13, 2015

(30) Foreign Application Priority Data

Feb. 8, 2014    (CN) .......................... 2014 1 0046109

(51) Int. Cl.
*H04N 9/73* (2006.01)
*H04N 5/222* (2006.01)
*H04N 5/225* (2006.01)

(52) U.S. Cl.
CPC ............ *H04N 5/2256* (2013.01); *H04N 9/735* (2013.01)

(58) Field of Classification Search
None
See application file for complete search history.

(56) References Cited

U.S. PATENT DOCUMENTS

| 2009/0136224 | A1* | 5/2009 | Aoyagi | G03B 15/05 396/157 |
| 2010/0141811 | A1* | 6/2010 | Gotanda | H04N 9/735 348/256 |
| 2010/0189429 | A1* | 7/2010 | Butterworth | G03B 7/08 396/155 |

\* cited by examiner

*Primary Examiner* — Aung S Moe
*Assistant Examiner* — Euel Cowan
(74) *Attorney, Agent, or Firm* — Zhigang Ma

(57) ABSTRACT

A method for controlling a flash of an electronic device by detecting an illumination intensity and a color temperature of a current environment from a RGB sensor. When the illumination intensity is lower than a first predetermined value, a pre-flash of the flash is turned on. Control a color temperature of the pre-flash to be equal to the color temperature when the color temperature is lower than a second predetermined value. A distance between a target object and the camera is obtained, adjusting the current of the high color temperature LED and the current of the low color temperature LED simultaneously according to the obtained distance after turning on a main-flash of the flash to capture an image of the target object.

18 Claims, 3 Drawing Sheets

ELECTRONIC DEVICE AND METHOD FOR CONTROLLING FLASH

CROSS-REFERENCE TO RELATED APPLICATIONS

This application claims priority to Chinese Patent Application No. 201410046109.9 filed on Feb. 8, 2014, the contents of which are incorporated by reference herein.

FIELD

The subject matter herein generally relates to photography, and particularly to an electronic device and method for controlling a flash of the electronic device.

BACKGROUND

An electronic device (e.g., a mobile phone or personal digital assistant) can be equipped with a flash to be used during image capturing. When the flash is used to assist the image capturing device to capture an image, it is difficult to adjust an illumination intensity and a color temperature of the flash according to environment conditions.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
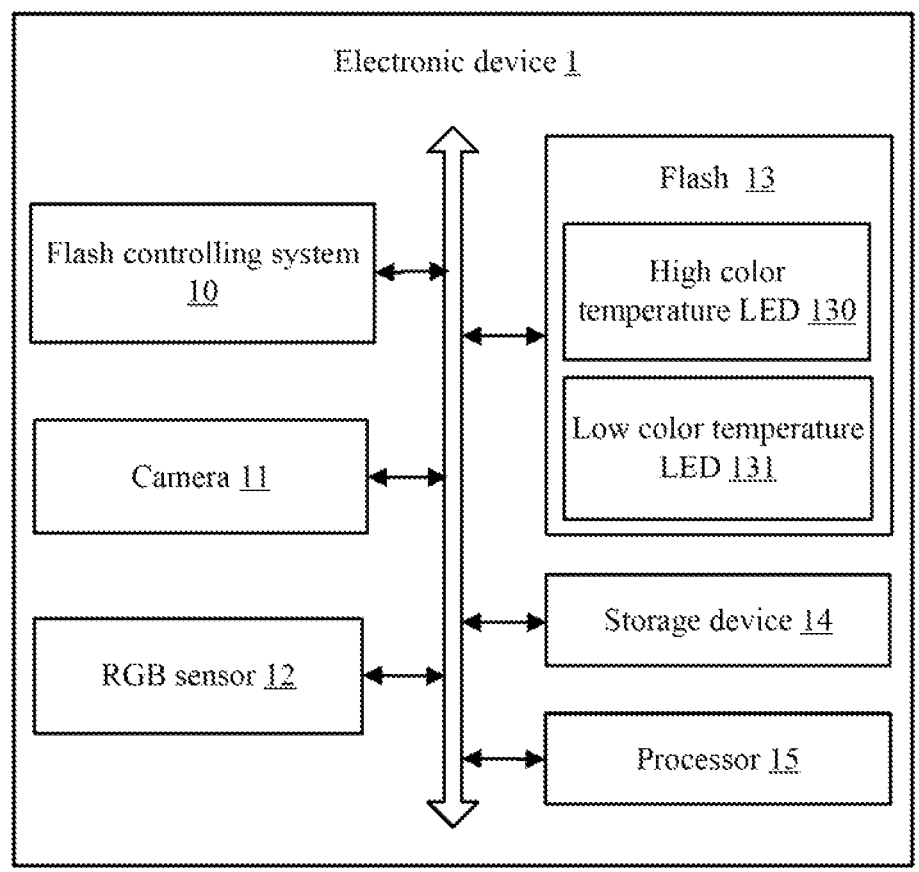
FIG. 1 is a block diagram of an example embodiment of an electronic device including a flash controlling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of an electronic device including a flash controlling system. In at least one embodiment, an electronic device 1 includes a flash controlling system 10, the electronic device 1 can be a smart phone, a personal digital assistant (PDA), a tablet computer, or other electronic device. The electronic device 1 further includes, but is not limited to, a camera 11, a red green blue (RGB) sensor 12, a flash 13, a storage device 14, and at least one processor 15. The flash 13 includes a high color temperature light-emitting diode (LED) 130 and a low color temperature LED 131. FIG. 1 illustrates only one example of the electronic device, other examples can include more or fewer components than as illustrated, or have a different configuration of the various components in other embodiments.

In at least one embodiment, the storage device 14 can include various types of non-transitory computer-readable storage mediums. For example, the storage device 14 can be an internal storage system, such as a flash memory, a random access memory (RAM) for temporary storage of information, and/or a read-only memory (ROM) for permanent storage of information. The storage device 14 can also be an external storage system, such as a hard disk, a storage card, or a data storage medium. The at least one processor 15 can be a central processing unit (CPU), a microprocessor, or other data processor chip that performs functions of the electronic device 1.

The flash controlling system 10 can control a color temperature of a pre-flash of the flash 13 to be equal to a detected color temperature of current environment by adjusting a ratio between current of the high color temperature LED 130 and current of the low color temperature LED 131, and adjust the current of the high color temperature LED 130 and the current of the low color temperature LED 131 simultaneously according to a distance between a target object to-be captured and the camera 11 after turning on a main-flash of the flash 13 during the capturing of an image.

Figure 2:
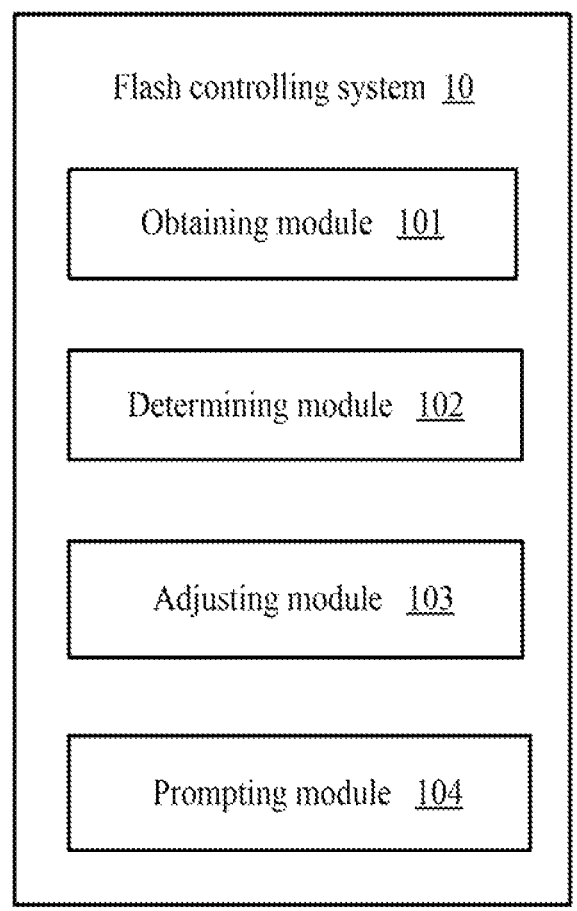
FIG. 2 is a block diagram of an example embodiment of function modules of the flash controlling system in the electronic device of FIG. 1.

FIG. 2 is a block diagram of one embodiment of function modules of the flash controlling system. In at least one embodiment, the flash controlling system 10 can include an obtaining module 101, a determining module 102, an adjusting module 103 and an prompting module 104. The function modules 101, 102, 103 and 104 can include computerized codes in the form of one or more programs, which are stored in the storage device 14. The at least one processor 15 executes the computerized codes to provide functions of the function modules 101-104.

The obtaining module 101 obtains an illumination intensity and a color temperature of a current environment from the RGB sensor 12. In at least one embodiment, the illumination intensity varies according to changes of light source. The RGB sensor 12 corrects a white balance of the camera 11 by detecting a color temperature of the current environment. The color temperature can be detected by measuring red, green and blue wavelength of the light source. For example, when the light source is natural light, an image may have better color balance effect under the condition that the color temperature of the current environment is 6500 k, and the image may be cold under the condition that the color temperature of the current environment is about 5000 k. For another example, when the light source is tungsten-halogen light source, the image may have better color balance effect under the condition that the color temperature of the current environment is about 2900 k, and the image may be warm under the condition that the color temperature of the current environment is about 2000 k.

The determining module 102 determines whether the flash 13 needs to be turned on according to the illumination intensity.

In at least one embodiment, the flash 13 provides a brief pre-flash emission before the shutter is opened and a main-flash emission when the shutter is opened. The determining module 102 determines that the pre-flash of the flash 13 needs to be turned on when the illumination intensity is lower than a first predetermined value, for example 30 Lux. The determining module 102 determines that the pre-flash of the flash 13 does not need to be turned on when the illumination intensity is higher than the first predetermined value.

The adjusting module 103 controls a color temperature of the pre-flash to be equal to the color temperature of the current environment after turning on the pre-flash, by adjusting a ratio between current of the high color temperature LED 130 and current of the low color temperature LED 131. In at least one embodiment, when the color temperature of the current environment is lower than a second predetermined value for example 4000K, the adjusting module 103 controls the color temperature of the pre-flash to be equal to the color temperature of the current environment by decreasing the current of the high color temperature LED 130 and increasing the current of the low color temperature LED 131 according to a first mapping table. When the color temperature of the current environment is greater than the second predetermined value, the adjusting module 103 controls the color temperature of the pre-flash to be equal to the color temperature of the current environment by increasing the current of the high color temperature LED 130 and decreasing the current of the low color temperature LED 131 according to the first mapping table.

The first mapping table can be pre-stored in the storage device 14. The first mapping table includes relations between a color temperature of the flash 13, one current of the high color temperature LED 130, and one current of the low color temperature LED 131. In at least one embodiment, the first mapping table provides a plurality of values of the color temperatures of the flash 13, and each of the color temperatures of the flash 13 corresponds to one current of the high color temperature LED 130, and one current of the low color temperature LED 131. Thus, when a color temperature of the flash 13 is detected, a corresponding current of the high color temperature LED 130 and a corresponding current of the low color temperature LED 131 can be determined according to the first mapping table. For example, when the color temperature of the flash 13 is 5787 k, the current of the high color temperature LED 130 is 0.8 A and the current of the low color temperature LED 131 is 0.2 A.

The obtaining module 101 obtains a distance between a target object to-be captured and the camera 11 from a focus information.

The adjusting module 103 adjusts the current of the high color temperature LED 130 and the current of the low color temperature LED 131 simultaneously according to the obtained distance after turning on a main-flash of the flash 13, and captures an image of the target object under the condition of keeping the ratio between the current of the high color temperature LED 130 and the current of the low color temperature LED 131 unchanged. In at least one embodiment, when the obtained distance is shorter than a third predetermined value, for example 50 cm., the adjusting module 103 decreases the current of the high color temperature LED 130 and the current of the low color temperature LED 131 simultaneously according to a second mapping table and keeps the ratio between the current of the high color temperature LED 130 and the current of the low color temperature LED 131 unchanged. When the obtained distance is longer than the third predetermined value, the adjusting module 103 increases the current of the high color temperature LED 130 and the current of the low color temperature LED 131 simultaneously according to the second mapping table and keeps the ratio of the current of the high color temperature LED 130 to the current of the low color temperature LED 131 unchanged.

The second mapping table can be pre-stored in the storage device 14. The second mapping table includes relations between a distance between a target object to-be captured and the camera 11, one current of the high color temperature LED 130, and one current of the low color temperature LED 131. In at least one embodiment, the second mapping table provides a plurality of values of the distances between a target object to-be captured and the camera 11, and each of the distances between a target object to-be captured and the camera 11 corresponds to one current of the high color temperature LED 130, and one current of the low color temperature LED 131. Thus, when the distance between a target object to-be captured and the camera 11 is obtained, the corresponding current of the high color temperature LED 130 and the corresponding current of the low color temperature LED 131 can be determined according to the second mapping table. For example, when the distance between a target object to-be captured and the camera 11 is 20 cm, the current of the high color temperature LED 130 is 100 mA and the current of the low color temperature LED 131 is 100 mA.

The prompting module 104 prompts a user to capture the image when the illumination intensity is higher than the first predetermined value.

Figure 3:
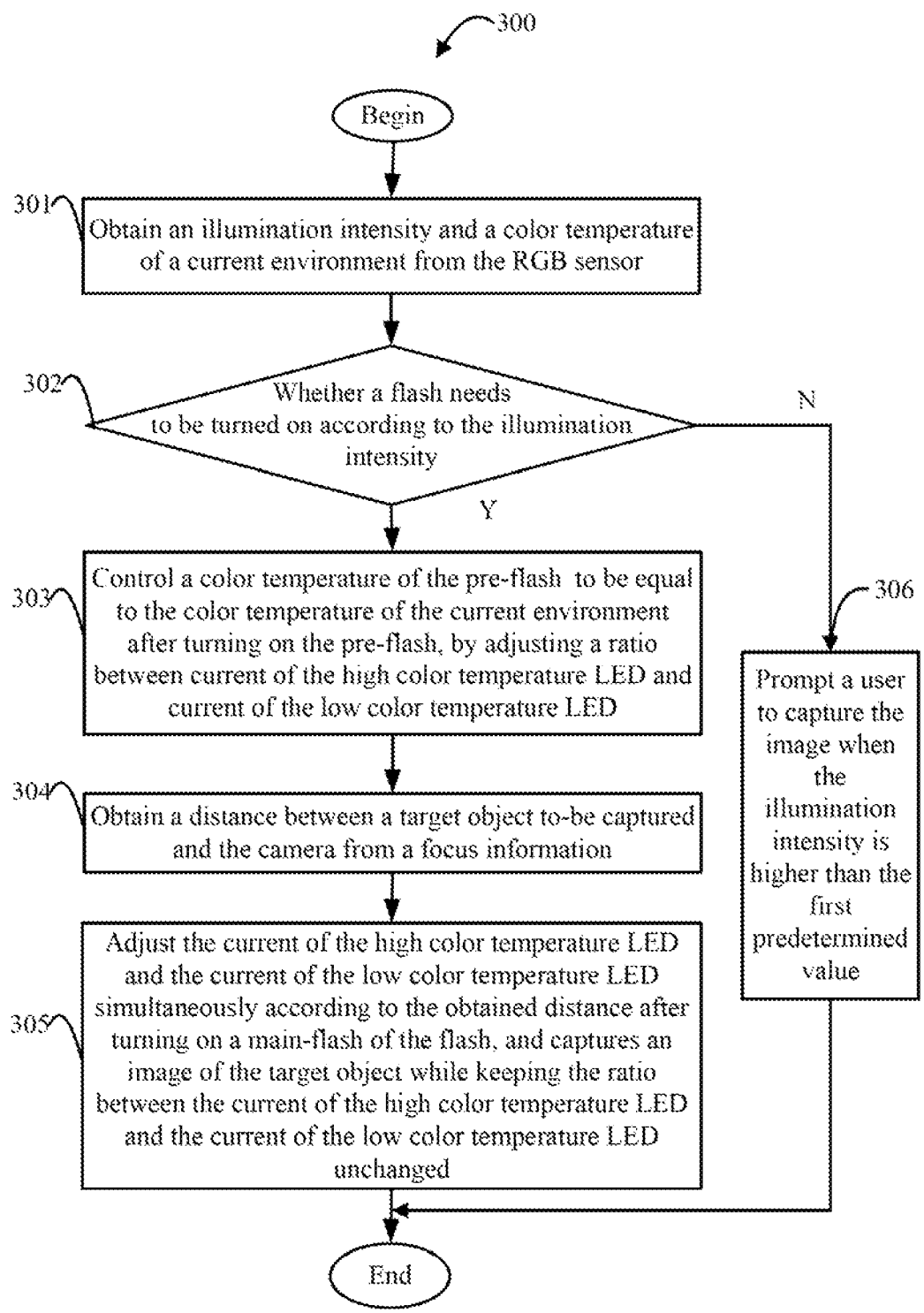
FIG. 3 is a flowchart of an example embodiment of a flash controlling method in the electronic device of FIG. 1.

FIG. 3 illustrates a flowchart of an example embodiment of a method 300 for controlling the flash of the electronic device of FIG. 1. In at least one embodiment, the method 300 is provided by way of example, as there are a variety of ways to carry out the method 300. The method 300 described below can be carried out using the configurations illustrated in FIG. 1, for example, and various elements of these figures are referenced in explaining example method. Each block shown in FIG. 3 represents one or more processes, methods, or subroutines, carried out in the exemplary method. Furthermore, the illustrated order of blocks is by example only and the order of the blocks can change according to the present disclosure. The exemplary method can begin at block 301. Depending on the embodiment, additional steps can be added, others removed, and the ordering of the steps can be changed.

At block 301, an obtaining module obtains an illumination intensity and a color temperature of a current environment from a RGB sensor.

At block 302, a determining module determines whether a flash needs to be turned on according to the illumination intensity. When the illumination intensity is lower than a first predetermined value, the pre-flash of the flash needs to be turned on, the process goes to block 303. When the illumination intensity is higher than the first predetermined value, the pre-flash of the flash does not need to be turned on, the process goes to block 306.

At block 303, an adjusting module controls a color temperature of the pre-flash to be equal to the color temperature of the current environment after turning on the pre-flash, by adjusting a ratio between current of the high color temperature LED and current of the low color temperature LED. In at least one embodiment, when the color temperature of the current environment is lower than a second predetermined value, the adjusting module controls the color temperature of the pre-flash to be equal to the color temperature of the current environment by decreasing the current of the high color temperature LED and increasing the current of the low color temperature LED according to a first mapping table. When the color temperature of the current environment is greater than the second predetermined value, the adjusting module controls the color temperature of the pre-flash to be equal to the color temperature of the current environment by increasing the current of the high color temperature LED and decreasing the current of the low color temperature LED according to the first mapping table.

At block 304, the obtaining module obtains a distance between a target object to-be captured and the camera from a focus information.

At block 305, the adjusting module adjusts the current of the high color temperature LED and the current of the low color temperature LED simultaneously according to the obtained distance after turning on a main-flash, and captures an image of the target object under the condition that keeping the ratio between the current of the high color temperature LED and the current of the low color temperature LED remain unchanged. In at least one embodiment, when the obtained distance is shorter than a third predetermined value, the adjusting module decreases the current of the high color temperature LED and the current of the low color temperature LED simultaneously according to a second mapping table and keeps the ratio between the current of the high color temperature LED and the current of the low color temperature LED unchanged. When the obtained distance is longer than the third predetermined value, the adjusting module increases the current of the high color temperature LED and the current of the low color temperature LED simultaneously according to the second mapping table and keeps the ratio of the current of the high color temperature LED to the current of the low color temperature LED unchanged.

At block 306, a prompting module prompts a user to capture the image when the illumination intensity is higher than the first predetermined value.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
  a camera, a red green blue (RGB) sensor, a flash comprising a high color temperature light-emitting diode (LED) and a low color temperature LED, and at least one processor; and
  a storage device that stores one or more programs, which when executed by the at least one processor, cause the at least one processor to:
  obtain an illumination intensity and a color temperature of a current environment from the RGB sensor;
  turn on a pre-flash of the flash when the illumination intensity is lower than a first predetermined value;
  control a color temperature of the pre-flash to be equal to the color temperature by adjusting a ratio between current of the high color temperature LED and current of the low color temperature LED when the color temperature is lower than a second predetermined value;
  obtain a distance between a target object and the camera;
  adjust the current of the high color temperature LED and the current of the low color temperature LED simultaneously according to the obtained distance after turning on a main-flash of the flash; and
  capture an image of the target object while keeping the ratio between the current of the high color temperature LED and the current of the low color temperature LED unchanged.

2. The electronic device according to claim 1, wherein the at least one processor further:
  prompts a user to capture the image when the illumination intensity is higher than the first predetermined value.

3. The electronic device according to claim 1, wherein the at least one processor further:
  controls the color temperature of the pre-flash to be equal to the color temperature by decreasing the current of the high color temperature LED and increasing the current of the low color temperature LED when the color temperature is lower than the second predetermined value; or
  controls the color temperature of the pre-flash to be equal to the color temperature by increasing the current of the high color temperature LED and decreasing the current of the low color temperature LED when the color temperature is higher than the second predetermined value.

4. The electronic device according to claim 3, wherein the at least one processor adjusts the current of the high color temperature LED and the current of the low color temperature LED according to a first mapping table which includes relations between the color temperature of the flash, the current of the high color temperature LED, and the current of the low color temperature LED.

5. The electronic device according to claim 1, wherein the at least one processor further:
  decreases the current of the high color temperature LED and the current of the low color temperature LED simultaneously and keeps the ratio between the current of the high color temperature LED and the current of the low color temperature LED unchanged when the obtained distance is shorter than a third predetermined value; or
  increases the current of the high color temperature LED and the current of the low color temperature LED simultaneously and keeps the ratio between the current of the high color temperature LED and the current of the low color temperature LED unchanged when the obtained distance is longer than the third predetermined value.

6. The electronic device according to claim 5, wherein the at least one processor adjusts the current of the high color temperature LED and the current of the low color temperature LED simultaneously according to a second mapping table which includes relations between the obtained distance, the current or the high color temperature LED, and the current of the low color temperature LED.

7. A computer-implemented method for controlling flash using an electronic device, the method comprising:
obtaining an illumination intensity and a color temperature of a current environment from the RGB sensor;
turning on a pre-flash of the flash when the illumination intensity is lower than a first predetermined value;
controlling a color temperature of the pre-flash to be equal to the color temperature by adjusting a ratio between current of the high color temperature LED and current of the low color temperature LED when the color temperature is lower than a second predetermined value;
obtaining a distance between a target object and the camera;
adjusting the current of the high color temperature LED and the current of the low color temperature LED simultaneously according to the obtained distance after turning on a main-flash of the flash; and
capturing an image of the target object while keeping the ratio between the current of the high color temperature LED and the current of the low color temperature LED unchanged.

8. The method according to claim 7, further comprising:
prompting a user to capture the image when the illumination intensity is higher than the first predetermined value.

9. The method according to claim 7, further comprising:
controlling the color temperature of the pre-flash to be equal to the color temperature by decreasing the current of the high color temperature LED and increasing the current of the low color temperature LED when the color temperature is lower than the second predetermined value; or
controlling the color temperature of the pre-flash to be equal to the color temperature by increasing the current of the high color temperature LED and decreasing the current of the low color temperature LED when the color temperature is higher than the second predetermined value.

10. The method according to claim 9, further comprising:
adjusting the current of the high color temperature LED and the current of the low color temperature LED according to a first mapping table which includes relations between the color temperature of the flash, the current of the high color temperature LED, and the current of the low color temperature LED.

11. The method according to claim 7, further comprising:
decreasing the current of the high color temperature LED and the current of the low color temperature LED simultaneously and keeping the ratio between the current of the high color temperature LED and the current of the low color temperature LED unchanged when the obtained distance is shorter than a third predetermined value; or
increasing the current of the high color temperature LED and the current of the low color temperature LED simultaneously and keeping the ratio between the current of the high color temperature LED and the current of the low color temperature LED unchanged when the obtained distance is longer than the third predetermined value.

12. The method according to claim 11, further comprising:
adjusting the current of the high color temperature LED and the current of the low color temperature LED simultaneously according to a second mapping table which includes relations between the obtained distance, the current of the high color temperature LED, and the current of the low color temperature LED.

13. A non-transitory storage medium having stored thereon instructions that, when executed by a processor of an electronic device, causes the processor to perform a method for controlling flash to take picture, the electronic device further comprising a camera, a red green blue (RGB) sensor, a flash comprising a high color temperature light-emitting diode (LED) and a low color temperature LED, and a storage device, wherein the method comprising:
obtaining an illumination intensity and a color temperature of a current environment from the RGB sensor;
turning on a pre-flash of the flash when the illumination intensity is lower than a first predetermined value;
controlling a color temperature of the pre-flash to be equal to the color temperature by adjusting a ratio between current of the high color temperature LED and current of the low color temperature LED when the color temperature is lower than a second predetermined value;
obtaining a distance between a target object and the camera;
adjusting the current of the high color temperature LED and the current of the low color temperature LED simultaneously according to the obtained distance after turning on a main-flash of the flash; and
capturing an image of the target object while keeping the ratio between the current of the high color temperature LED and the current of the low color temperature LED unchanged.

14. The non-transitory storage medium according to claim 13, the method further comprising:
prompting a user to capture the image when the illumination intensity is higher than the first predetermined value.

15. The non-transitory storage medium according to claim 13, the method comprising:
controlling the color temperature of the pre-flash to be equal to the color temperature by decreasing the current of the high color temperature LED and increasing the current of the low color temperature LED when the color temperature is lower than the second predetermined value; or
controlling the color temperature of the pre-flash to be equal to the color temperature by increasing the current of the high color temperature LED and decreasing the current of the low color temperature LED when the color temperature is higher than the second predetermined value.

16. The non-transitory storage medium according to claim 15, the method further comprising:
adjusting the current of the high color temperature LED and the current of the low color temperature LED according to a first mapping table which includes relations between the color temperature of the flash, the current of the high color temperature LED, and the current of the low color temperature LED.

17. The non-transitory storage medium according to claim 13, the method further comprising:
- decreasing the current of the high color temperature LED and the current of the low color temperature LED simultaneously and keeping the ratio between the current of the high color temperature LED and the current of the low color temperature LED unchanged when the obtained distance is shorter than a third predetermined value; or
- increasing the current of the high color temperature LED and the current of the low color temperature LED simultaneously and keeping the ratio between the current of the high color temperature LED and the current of the low color temperature LED unchanged when the obtained distance is longer than the third predetermined value.

18. The non-transitory storage medium according to claim 17, the method further comprising:
- adjusting the current of the high color temperature LED and the current of the low color temperature LED simultaneously according to a second mapping table which includes relations between the obtained distance, the current of the high color temperature LED, and the current of the low color temperature LED.

\* \* \* \* \*